（12）United States Patent
Koenig et al.

(10) Patent No.: US 8,968,136 B2
(45) Date of Patent: Mar. 3, 2015

(54) DUAL CLUTCH TRANSMISSION HAVING SIMPLIFIED CONTROLS

(75) Inventors: Melissa Koenig, Howell, MI (US); Mark Buchanan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 703 days.

(21) Appl. No.: 12/937,300

(22) PCT Filed: May 20, 2008

(86) PCT No.: PCT/US2008/006439
§ 371 (c)(1),
(2), (4) Date: Oct. 11, 2010

(87) PCT Pub. No.: WO2009/128806
PCT Pub. Date: Oct. 22, 2009

(65) Prior Publication Data
US 2011/0030493 A1    Feb. 10, 2011

Related U.S. Application Data

(60) Provisional application No. 61/046,123, filed on Apr. 18, 2008.

(51) Int. Cl.
*F16H 31/00* (2006.01)
*F16H 61/688* (2006.01)
(Continued)

(52) U.S. Cl.
CPC .......... *F16H 61/688* (2013.01); *F16H 61/0206* (2013.01); *F16H 3/006* (2013.01); *F16H 3/093* (2013.01); *F16H 61/0251* (2013.01); *F16H 2200/0047* (2013.01)

USPC .......... 475/120; 475/116; 475/128; 475/130; 74/330; 74/730.1

(58) Field of Classification Search
CPC . F16H 61/686; F16H 61/0206; F16H 61/061; F16H 61/12; F16H 61/0021; F16H 61/143; F16H 61/46; F16H 61/462; F16H 61/688
USPC ............ 74/330, 335; 475/116, 120, 121, 127, 475/128, 130
See application file for complete search history.

(56) References Cited

U.S. PATENT DOCUMENTS 1,233,561 A    7/1917    Dornfeld
2,174,395 A    9/1939    Aikman
(Continued)

FOREIGN PATENT DOCUMENTS

DE    871857    7/1949
DE    953406    11/1956
(Continued)

*Primary Examiner* — Justin Krause
*Assistant Examiner* — Alexander Vu
(74) *Attorney, Agent, or Firm* — BrooksGroup

(57) ABSTRACT

A dual clutch transmission (500) having a plurality of forward gears and at least one reverse gear (582) where the first gear is operatively engaged by a one-way clutch (594). A pair of actuator control valves (270, 272) is employed to move actuators to engage selective ones of the forward gear sets. A multiplex valve (284) is disposed in fluid communication between the pair of actuator control valves (270, 272) and the actuators associated with the forward gears of the transmission and is adapted to selectively provide fluid communication to the actuators to thereby select the forward gear ratios. A manual valve (185) is operatively connected to the gear shift selector (187) to control the actuator associated with reverse gear (582).

9 Claims, 3 Drawing Sheets

(51) Int. Cl.
*F16H 61/02* (2006.01)
*F16H 3/00* (2006.01)
*F16H 3/093* (2006.01)

(56) References Cited

U.S. PATENT DOCUMENTS

| | | | |
|---|---|---|---|
| 2,639,013 A | 5/1953 | Meschia | |
| 2,919,778 A | 1/1960 | Aschauer | |
| 2,943,502 A | 7/1960 | Perkins et al. | |
| 3,040,408 A | 6/1962 | Schou | |
| 3,171,522 A | 3/1965 | Petrie et al. | |
| 3,313,385 A | 4/1967 | Faster | |
| 3,362,481 A | 1/1968 | Steinhagen | |
| 3,490,312 A | 1/1970 | Seitz et al. | |
| 3,534,824 A | 10/1970 | Davison, Jr. | |
| 3,537,556 A | 11/1970 | Pfeffer et al. | |
| 3,589,483 A | 6/1971 | Smith | |
| 3,612,237 A | 10/1971 | Honda | |
| 3,654,692 A | 4/1972 | Goetz | |
| 3,760,918 A | 9/1973 | Wetrich et al. | |
| 3,823,801 A | 7/1974 | Arnold | |
| 3,834,503 A | 9/1974 | Maurer et al. | |
| 3,858,698 A | 1/1975 | Hause | |
| 4,081,065 A | 3/1978 | Smyth et al. | |
| 4,205,739 A | 6/1980 | Shelby et al. | |
| 4,219,246 A | 8/1980 | Ladin | |
| 4,270,647 A | 6/1981 | Leber | |
| 4,301,904 A | 11/1981 | Ahlen | |
| 4,361,060 A | 11/1982 | Smyth | |
| 4,372,434 A | 2/1983 | Aschauer | |
| 4,461,188 A | 7/1984 | Fisher | |
| 4,476,748 A | 10/1984 | Morscheck | |
| 4,501,676 A | 2/1985 | Moorhouse | |
| 4,513,631 A | 4/1985 | Koivunen | |
| 4,540,078 A | 9/1985 | Wetrich | |
| 4,544,057 A | 10/1985 | Webster et al. | |
| 4,548,306 A | 10/1985 | Hartz | |
| 4,557,363 A | 12/1985 | Golan | |
| 4,627,312 A | 12/1986 | Fujieda et al. | |
| 4,646,891 A | 3/1987 | Braun | |
| 4,662,866 A | 5/1987 | Ehnstrom | |
| 4,667,534 A | 5/1987 | Kataoka | |
| 4,667,798 A | 5/1987 | Sailer et al. | |
| 4,700,823 A | 10/1987 | Winckler | |
| 4,713,980 A | 12/1987 | Ida et al. | |
| 4,722,237 A | 2/1988 | McNinch, Jr. | |
| 4,732,253 A | 3/1988 | Hiramatsu et al. | |
| 4,753,332 A | 6/1988 | Bieber et al. | |
| 4,785,682 A * | 11/1988 | Nishimura et al. | 74/359 |
| 4,793,213 A * | 12/1988 | Nishimura | 74/730.1 |
| 4,802,564 A | 2/1989 | Stodt | |
| 4,808,015 A | 2/1989 | Babcock | |
| 4,827,784 A | 5/1989 | Muller et al. | |
| 4,841,803 A | 6/1989 | Hamano et al. | |
| 4,876,923 A * | 10/1989 | Crandall et al. | 475/60 |
| 4,905,801 A | 3/1990 | Tezuka | |
| 4,947,970 A | 8/1990 | Miller et al. | |
| 4,957,016 A | 9/1990 | Amedei et al. | |
| 5,050,714 A | 9/1991 | Kurihara et al. | |
| 5,174,420 A | 12/1992 | DeWald et al. | |
| 5,207,617 A * | 5/1993 | Kato et al. | 474/28 |
| 5,232,411 A | 8/1993 | Hayashi et al. | |
| 5,259,476 A | 11/1993 | Matsuno et al. | |
| 5,275,267 A | 1/1994 | Slicker | |
| 5,284,232 A | 2/1994 | Prud'Homme | |
| 5,291,804 A * | 3/1994 | Kashihara et al. | 475/127 |
| 5,305,863 A | 4/1994 | Gooch et al. | |
| 5,383,544 A | 1/1995 | Patel | |
| 5,439,088 A | 8/1995 | Michioka et al. | |
| 5,444,623 A | 8/1995 | Genise | |
| 5,445,043 A | 8/1995 | Eaton et al. | |
| 5,450,934 A | 9/1995 | Maucher | |
| 5,469,943 A | 11/1995 | Hill et al. | |
| 5,495,927 A | 3/1996 | Samie et al. | |
| 5,499,704 A | 3/1996 | Hays | |
| 5,505,286 A | 4/1996 | Nash | |
| 5,522,775 A | 6/1996 | Maruyama et al. | |
| 5,538,121 A | 7/1996 | Hering | |
| 5,577,588 A | 11/1996 | Raszkowski | |
| 5,609,067 A | 3/1997 | Mitchell et al. | |
| 5,613,588 A | 3/1997 | Vu | |
| 5,630,773 A | 5/1997 | Slicker et al. | |
| 5,634,541 A | 6/1997 | Maucher | |
| 5,634,867 A | 6/1997 | Mack | |
| 5,662,198 A | 9/1997 | Kojima et al. | |
| 5,679,098 A | 10/1997 | Shepherd et al. | |
| 5,711,409 A | 1/1998 | Murata | |
| 5,720,203 A | 2/1998 | Honda et al. | |
| 5,755,314 A | 5/1998 | Kanda et al. | |
| 5,782,710 A | 7/1998 | Kosik et al. | |
| 5,851,164 A | 12/1998 | Habuchi et al. | |
| 5,890,392 A | 4/1999 | Ludanek et al. | |
| 5,899,310 A | 5/1999 | Mizuta | |
| 5,908,100 A | 6/1999 | Szadkowski et al. | |
| 5,915,512 A | 6/1999 | Adamis et al. | |
| 5,918,715 A | 7/1999 | Ruth et al. | |
| 5,950,781 A | 9/1999 | Adamis et al. | |
| 5,964,675 A | 10/1999 | Shimada et al. | |
| 5,966,989 A | 10/1999 | Reed, Jr. et al. | |
| 5,979,257 A | 11/1999 | Lawrie | |
| 6,000,510 A | 12/1999 | Kirkwood et al. | |
| 6,006,620 A | 12/1999 | Lawrie et al. | |
| 6,007,458 A * | 12/1999 | Ohashi et al. | 477/154 |
| 6,012,561 A | 1/2000 | Reed, Jr. et al. | |
| 6,026,944 A | 2/2000 | Satou et al. | |
| 6,044,719 A | 4/2000 | Reed, Jr. et al. | |
| 6,071,211 A | 6/2000 | Liu et al. | |
| 6,077,190 A * | 6/2000 | Tabata et al. | 477/97 |
| 6,116,397 A | 9/2000 | Kosumi et al. | |
| 6,145,398 A | 11/2000 | Bansbach et al. | |
| 6,164,149 A | 12/2000 | Ohmori et al. | |
| 6,171,212 B1 | 1/2001 | Reuschel | |
| 6,189,669 B1 | 2/2001 | Kremer et al. | |
| 6,216,081 B1 * | 4/2001 | Tabata et al. | 701/87 |
| 6,217,479 B1 | 4/2001 | Brown et al. | |
| 6,244,407 B1 | 6/2001 | Kremer et al. | |
| 6,269,293 B1 | 7/2001 | Correa et al. | |
| 6,286,381 B1 | 9/2001 | Reed, Jr. et al. | |
| 6,299,565 B1 | 10/2001 | Jain et al. | |
| 6,364,809 B1 | 4/2002 | Cherry | |
| 6,393,943 B1 | 5/2002 | Sommer et al. | |
| 6,415,213 B1 | 7/2002 | Hubbard et al. | |
| 6,419,062 B1 | 7/2002 | Crowe | |
| 6,435,049 B1 | 8/2002 | Janasek et al. | |
| 6,463,821 B1 | 10/2002 | Reed, Jr. et al. | |
| 6,523,657 B1 | 2/2003 | Kundermann et al. | |
| 6,536,296 B2 | 3/2003 | Sakamoto et al. | |
| 6,602,161 B2 | 8/2003 | Hemmingsen et al. | |
| 6,615,966 B2 | 9/2003 | Kato | |
| 6,626,056 B2 | 9/2003 | Albert et al. | |
| 6,631,651 B2 * | 10/2003 | Petrzik | 74/346 |
| 6,656,090 B2 | 12/2003 | Matsumura et al. | |
| 6,669,596 B1 | 12/2003 | Sefcik | |
| 6,695,748 B2 | 2/2004 | Kopec et al. | |
| 6,715,597 B1 | 4/2004 | Buchanan et al. | |
| 6,736,751 B1 | 5/2004 | Usoro et al. | |
| 6,752,743 B2 | 6/2004 | Eich et al. | |
| 6,789,658 B2 * | 9/2004 | Busold et al. | 192/103 F |
| 6,835,151 B2 * | 12/2004 | Fujimine et al. | 475/116 |
| 6,868,949 B2 | 3/2005 | Braford, Jr. | |
| 6,869,382 B2 | 3/2005 | Leising et al. | |
| 6,883,394 B2 | 4/2005 | Koenig et al. | |
| 6,953,417 B2 | 10/2005 | Koenig | |
| 7,311,187 B2 | 12/2007 | Koenig et al. | |
| 7,318,512 B2 | 1/2008 | Bauer et al. | |
| 7,340,335 B2 * | 3/2008 | Kitaori et al. | 701/51 |
| 2002/0014386 A1 | 2/2002 | Diemer et al. | |
| 2002/0185351 A1 | 12/2002 | Berger et al. | |
| 2003/0057051 A1 | 3/2003 | Alfredsson | |
| 2003/0075413 A1 | 4/2003 | Alfredsson | |
| 2003/0178275 A1 | 9/2003 | Breier et al. | |
| 2004/0060378 A1 | 4/2004 | Yamamoto et al. | |
| 2004/0060793 A1 | 4/2004 | Dacho et al. | |
| 2004/0206599 A1 | 10/2004 | Hegerath | |

(56) References Cited

U.S. PATENT DOCUMENTS

| | | |
|---|---|---|
| 2005/0000774 A1 | 1/2005 | Friedmann |
| 2005/0067251 A1 | 3/2005 | Braford, Jr. et al. |
| 2005/0279605 A1 | 12/2005 | Sowul et al. |
| 2006/0005647 A1 | 1/2006 | Braford et al. |
| 2006/0006042 A1 | 1/2006 | Koenig |
| 2006/0006043 A1* | 1/2006 | Koenig et al. ............ 192/113.3 |
| 2006/0009326 A1* | 1/2006 | Stefina ........................ 477/127 |
| 2007/0254775 A1* | 11/2007 | Kishi ........................... 477/115 |
| 2008/0006029 A1* | 1/2008 | Kitou et al. .................... 60/459 |
| 2011/0030493 A1* | 2/2011 | Koenig et al. ............. 74/473.11 |

FOREIGN PATENT DOCUMENTS

| | | |
|---|---|---|
| DE | 1146314 | 3/1963 |
| DE | 1217800 | 5/1966 |
| DE | 3149880 C2 | 7/1982 |
| DE | 3118565 A1 | 11/1982 |
| DE | 3532759 C1 | 3/1987 |
| DE | 19700635 C2 | 8/1997 |
| DE | 10012122 A1 | 9/2000 |
| DE | 10034677 A1 | 2/2002 |
| DE | 10049474 A1 | 4/2002 |
| DE | 10118756 A1 | 5/2002 |
| DE | 10115454 A1 | 8/2002 |
| DE | 10156789 A1 | 8/2002 |
| DE | 10125172 A1 | 11/2002 |
| DE | 10143834 A1 | 3/2003 |
| EP | 0120617 A1 | 10/1984 |
| EP | 0762009 A1 | 3/1997 |
| EP | 0848179 A1 | 6/1998 |
| EP | 1195537 A1 | 4/2002 |
| EP | 1420185 A2 | 11/2003 |
| EP | 1531292 A2 | 11/2004 |
| EP | 1703178 A2 | 9/2006 |
| EP | 1788288 A2 | 5/2007 |
| FR | 1246517 | 10/1960 |
| FR | 2123828 | 8/1972 |
| GB | 2036203 A | 6/1980 |
| GB | 2356438 A | 5/2001 |
| JP | 4366032 | 12/1992 |
| JP | 8200393 | 8/1996 |
| JP | 2005147403 | 6/2005 |
| WO | 2004005744 A1 | 1/2004 |
| WO | 2006086704 A2 | 8/2006 |
| WO | 2009128806 A1 | 10/2009 |

* cited by examiner

DUAL CLUTCH TRANSMISSION HAVING SIMPLIFIED CONTROLS

BACKGROUND OF THE INVENTION

1. Field of the Invention

The present invention relates, generally, to dual clutch transmissions and, more specifically, to dual clutch transmissions having an area controlled hydraulic circuit used for governing the flow of cooling fluid provided to each of the two clutches of a dual clutch transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. One type of transmission that has been proposed for use in conventional motor vehicles includes automated manual-type transmissions.

Some automated manual type transmissions can be power-shifted to permit gearshifts to be made under load. Automated manual transmissions having two clutches are generally referred to simply as dual, or twin, clutch transmissions. The dual clutch structure is most often configured so as to derive power input from a single engine flywheel arrangement. However, some designs have a dual clutch assembly having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmissions may include two wet or dry disc clutches each with its own clutch actuator to control the engagement and disengagement of the two-clutch discs independently. While the clutch actuators may be of the electro-mechanical type, a wet clutch system requires a lubrication system including a pump. Dual clutch transmissions of this type utilize hydraulic shifting and clutch control. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform upshifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved. In some dual clutch transmissions, the synchronizers are located on the countershafts, due to the arrangement of the coaxial input shafts and countershafts and the desire to minimize the length of the transmissions. This arrangement can permit the pinions on the input shafts to be more closely spaced than if the synchronizers were located on the input shafts and between the pinions. However, dual clutch transmissions of this type suffer from certain disadvantages.

For example, each of the synchronizers must have a capacity sufficient to transfer torque between the countershaft and the selected gear located on the countershaft. The diameters of the gears vary depending upon the desired gear ratio. In first gear, it is often desirable to provide the countershaft with a reduction in the rotational speed and with an increased torque relative to the torque and speed of the input shaft. In order to accomplish this, the first gear pinions often have a relatively small diameter, which is limited by the diameter of its respective input shaft. The corresponding first gear on the countershaft is necessarily of very large diameter. The second gear pinion located on the even input shaft typically has a larger diameter than the first gear pinion, and the second gear located on the countershaft typically has a smaller diameter than the second gear, and so on.

Due to the comparatively large reduction in speed and increase in torque desired for the first gear ratio, the synchronizer torque capacity for the first gear on the countershaft often must be significantly greater than the synchronizer capacities for the other gears. Because the synchronizer for first gear is mounted on the countershaft, the synchronizer must have sufficient torque capacity to compensate for the additional torque load imposed by the relatively high gear ratio and rotational inertia for first gear. In general, the more capacity that is required for the synchronizer, the larger and more costly the synchronizer is. Therefore, in order to minimize the cost of such transmissions, a variety of different synchronizers having different capacities are used. For example, the synchronizers for first gear typically are larger and more costly than the synchronizers for the other gears, and may be of a different more complex construction, such as a multi-cone synchronizer. These more complicated, more costly synchronizers also raise additional durability and service issues.

In addition, the arrangement of the pinions and gears limits the minimum diameters (perpendicular to the axis of the input shafts) and the minimum lengths (parallel to the axis of the input shafts) of the transmission. For example, the diameter of the first gear, which is typically the largest gear diameter, is often a factor that limits efforts to reduce the diameter of the overall transmission. In addition, the number of gears on the countershaft can be a limiting factor on the minimum length of the transmission, because the gears are typically aligned in series, with a separate countershaft gear provided for each of the gears of the input shaft for the different gear ratios.

Accordingly, there remains a need in the art for a dual clutch transmission that has an even more simplified construction, reduces expensive components, and facilitates a smaller packaging envelope that allows the transmission to be employed in even smaller spaces.

In order to provide sufficient cooling to the clutch assemblies of the conventional dual clutch transmission, the clutch assemblies are usually bathed in transmission fluid in a generally uncontrolled manner. While dual clutch transmissions have overcome several drawbacks associated with conventional transmissions and the newer automated manual transmissions, it has been found that controlling and regulating the automatically actuated dual clutch transmission to achieve the desired vehicle occupant comfort goals is a complicated matter. There are a large number of events to properly time and execute within the transmission for each shift to occur smoothly and efficiently. In addition, the clutch and complex gear mechanisms, working within the close confines of the dual clutch transmission case, generate a considerable amount of heat.

Accordingly, there remains a need in the related art for an improved hydraulic circuit to provide cooling fluid and control to the clutch assemblies of the dual clutch transmissions. Specifically, there is a need for a dual clutch transmission having an improved hydraulic control that has a reduced complexity resulting in lower cost and a smaller packaging envelope while still maintaining good operational characteristics.

SUMMARY OF THE INVENTION

Thus, the present invention overcomes the disadvantages in the related art in a dual clutch transmission having a plurality of forward gears and at least one reverse gear for providing rotational output in two directions and at different gear ratios. The dual clutch transmission includes a first gear set operatively engaged by a one-way clutch. A plurality of actuators are adapted to selectively engage the other gears of the plurality of gear sets to selectively provide torque translation through the plurality of forward gears and at least one reverse gear. The transmission also includes a hydraulic circuit having a source of pressurized fluid. A pair of actuator control valves are in fluid communication with the source of pressurized fluid. The pair of actuator control valves are adapted to move the actuators to engage selective ones of the forward gear sets. A multiplex valve is disposed in fluid communication between the pair of actuator control valves and the actuators associated with the forward gears of the transmission and is adapted to selectively provide fluid communication to the actuators to thereby select the forward gear ratios. A manual valve is operatively connected to the gear shift selector and is in fluid communication with the source of pressurized fluid. The manual valve is operable to control the actuator associated with the reverse gear in response to selection of the reverse gear via the gear shift selector to move the actuator into and out of engagement with the reverse gear set.

In this way, the dual clutch transmission of the present invention has a more simplified construction that reduces expensive components, such as synchronizers and solenoid-actuated control valves, and facilitates a smaller packaging envelope that allows the transmission to be employed in even smaller spaces. Moreover, the transmission of the present invention employs a simplified hydraulic circuit that provides cooling fluid and control to the clutch assemblies but which has a much reduced complexity resulting in lower cost and also contributes to the smaller packaging envelope while still maintaining good operational characteristics.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
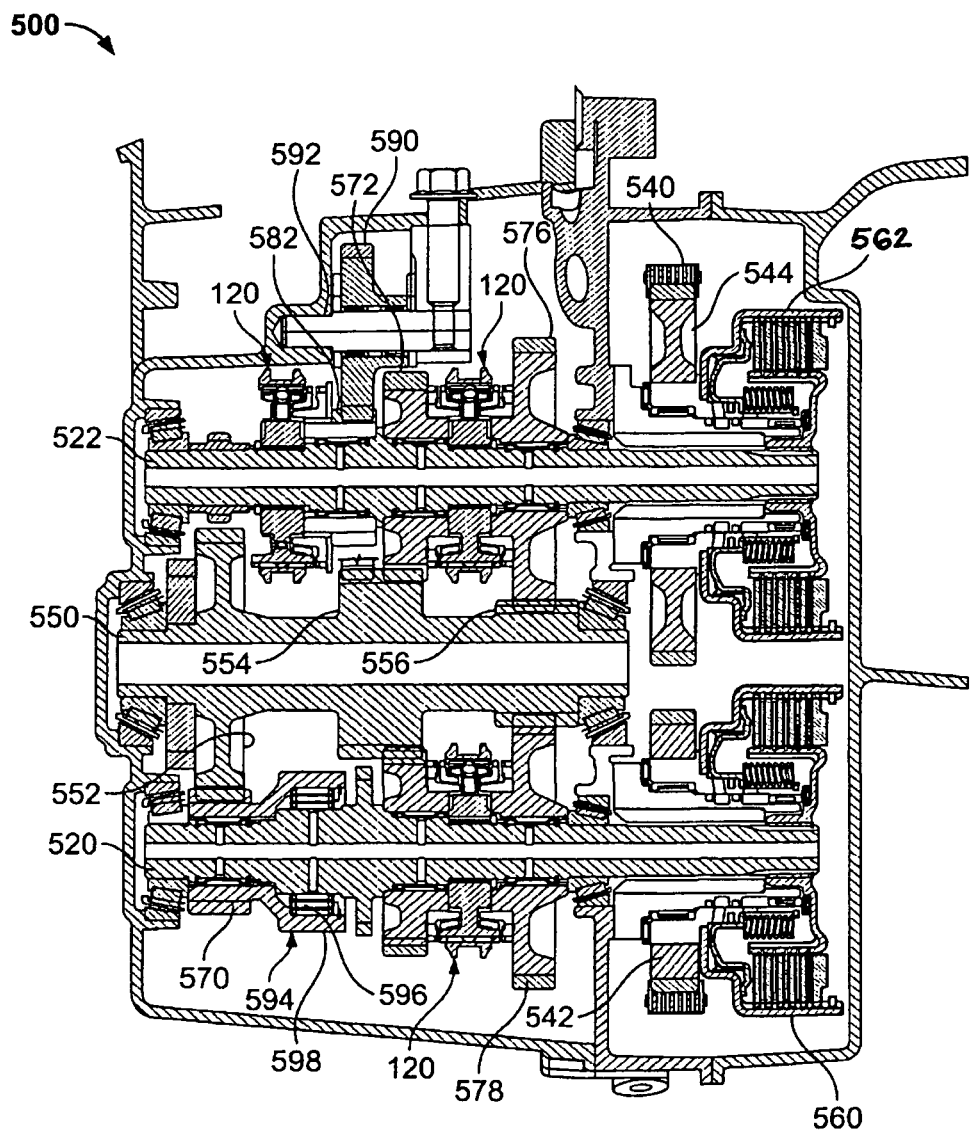
FIG. 1 is a cross-sectional view of one embodiment of the dual clutch transmission of the present invention having five speeds and showing a first or odd input shaft, a second or even input shaft, and a countershaft, a one-way clutch disposed between a first gear pinion and the first input shaft and a synchronizer-operated reverse gear.
Figure 2:
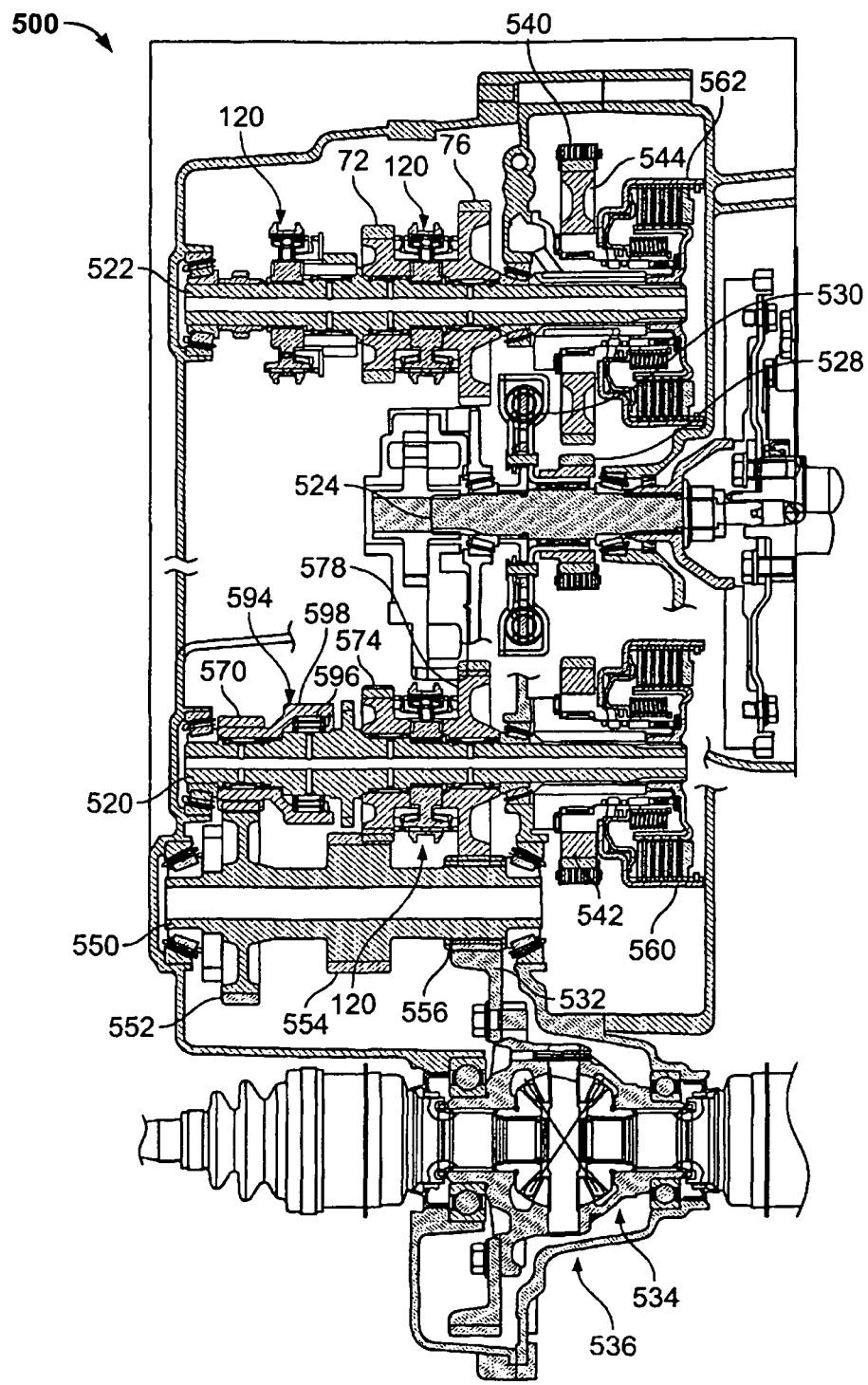
FIG. 2 is a different cross-sectional view of the dual clutch transmission illustrated in FIG. 1 showing the first or odd input shaft, the countershaft, and an engine input shaft, the one-way clutch disposed between the first or odd input shaft and the first gear pinion and an external damper.

A representative example of the dual clutch transmission of the present invention is generally indicated at 500 in FIGS. 1 and 2 where like numerals are used to describe like components throughout the figures. Specifically, as shown in FIG. 1, the dual clutch transmission 500 includes pair of clutches, generally indicated at 560 and 562, respectively, a first or odd input shaft, generally indicated at 520, a second or even input shaft, generally indicated at 522, a counter shaft, generally indicated at 550, an output shaft 536, and a plurality of synchronizers, as will be described in greater detail below.

The dual clutch transmission 500 forms a portion of a vehicle powertrain and is responsible for taking a torque input from a prime mover, such as an internal combustion engine, and transmitting the torque through selectable gear ratios to the vehicle drive wheels. The dual clutch transmission 500 operatively routes the applied torque from the engine through the dual clutches to either the first or odd input shaft 520 or the second or even input shaft 522. The input shafts 520 and 522 include a first series of gears, which are in constant mesh with a second series of gears disposed on the counter shaft 550. Each one of the first series of gears interacts with one of the second series of gears to provide the different gear ratios sets used for transferring torque. A plurality of synchronizers 120 are disposed on the two input shafts 520, 522 and are operatively controlled by the plurality of shift actuators 526 (schematically illustrated in FIG. 3) to selectively engage one of the gear ratio sets. Thus, torque is transferred from the engine to the dual clutch assembly, to one of the input shafts 520 or 522 through one of the gear ratio sets, and to the output gear 532 which drives the transaxle 536. The transaxle 536 has a differential 534 and further provides the output torque to the remainder of the powertrain. Each of these components will be discussed in greater detail below.

More specifically, the dual clutch transmission 500 illustrated in FIGS. 1 and 2 employs a pair of clutch systems 560 and 562 that are provided to selectively transfer torque from an engine input shaft 524 to an odd input shaft 520 and an even input shaft 522, each having a plurality of gear pinions selectively engagable therewith so that the pinions may be driven for rotation upon their respective input shafts. On the upstream side of the clutch systems 560 and 562, the engine input shaft 524 drives an engine input sprocket 528 for rotation. A damper 530 (FIG. 2) is disposed between the engine input shaft 524 and the engine input sprocket 528 for absorbing vibrations. Also on the upstream side of the clutches 560 and 562, an odd clutch drive sprocket 542 is connected to the input side of the odd clutch 560 and an even clutch drive sprocket 544 is connected to the input side of the even clutch 562. The odd clutch drive sprocket 542 and the even clutch drive sprocket 544 are simultaneously driven for rotation by the engine input sprocket 528, such as by a chain, gears, or a combination thereof. For example, a single chain 540 may be used to simultaneously drive the odd clutch drive sprocket 542 and the even clutch drive sprocket 544 using the engine input sprocket 528.

On the downstream side of the clutches 560 and 562, the input side of the odd clutch 560 is engaged with the odd transmission input shaft 520 and the input side of the even clutch 562 is engaged with the even transmission input shaft 522. Odd numbered gear pinions are positioned axially along the odd input shaft 520. Thus, in this example a first gear pinion 570, third gear pinion 574, and fifth gear pinion 578 are supported upon the odd input shaft 520. Even numbered gear pinions are positioned axially along the even input shaft 522. Thus, in this example a second gear pinion 572 and fourth gear pinion 576 are supported upon the even input shaft 522. In addition, a synchronizer-operated reverse gear pinion 582 is positioned on the even input shaft 522. Each of the gear pinions 570, 572, 576, 574, 578 and 582 is selectively engagable with its respective shaft 520 or 522 to be driven for rotation thereby. While synchronizers 120 are employed to engage each of the other gear pinions, the first gear pinion 570 is selectively engagable with the odd input shaft 520 by the one way clutch 598 to be driven for rotation thereby when the engine input sprocket 528 is driven for rotation at certain predetermined rotational speeds. More specifically, and in the representative dual clutch transmission illustrated in FIGS. 1 and 2, the one way clutch 594 eliminates the need for a synchronizer 120 to be used for engaging the associated pinion 570 with respective input shaft 520. This effectively reduces the number of synchronizers 120 that are used in the dual clutch transmission 500, thereby reducing the cost of this device.

As noted above, prior transmission systems require a first gear pinion having a very small diameter because the entire gear ratio is determined by the ratio between the first gear pinion located on the respective input shaft and the relatively large corresponding first gear located on the countershaft. This requirement for a minimum diameter first gear pinion has the result that the first gear pinion is often machined onto the input shaft, which prevents the use of a one-way clutch between the first gear pinion and the input shaft. The provision in the present transmission 500 of both gear ratios between the engine input, clutch input, and gear ratios between the input shaft pinions and countershaft gears, working in combination, permits the reduction in the size disparity between the first gear pinion 570 and the corresponding first gear 552. Thus, the diameter of the first gear pinion 570 can be increased by an amount sufficient to place the one-way clutch 594 between the odd input shaft 520 and the first gear pinion 570.

In the example of the dual clutch transmission illustrated in FIGS. 1 and 2, the one-way clutch 594 includes a portion having the first gear pinion 570 formed thereon and an adjacent race portion 598. A set of one-way clutch bearings 596 are positioned between the race portion 598 of the one-way clutch 594 and the odd input shaft 520. When the engine input shaft 524 drives both the odd input shaft 520 and the even input shaft 522 for rotation up to a pre-selected maximum rotational speed, the one-way clutch bearings 596 will frictionally engage between the race portion 598 of the one-way clutch 594 and the odd input shaft 520 to cause the first gear 570 to be driven for rotation by the odd input shaft 520. Once that pre-selected maximum rotational speed is exceeded, the one-way clutch bearings 596 are allowed to freewheel between the race portion 598 of the one-way clutch 594 and the odd input shaft 520. The first gear 570 is no longer driven for rotation by the odd input shaft 520, thereby permitting other gears on the odd input shaft 520, such as third gear 574 and fifth gear 578, to be selectively driven for rotation by the odd input shaft 520. Similarly, other gear pinions on the even input shaft 522 may also be driven for rotation, such as second gear pinion 582 and fourth gear pinion 576.

Synchronizers 120 are used to engage the other gear pinions 572, 576, 574, 578, and 582 with their respective input shafts 520 or 522 so that they are driven for rotation with the shafts. More specifically, one synchronizer 120 is positioned on the odd input shaft 520 and can selectively engage either the third gear pinion 574 or the fifth gear pinion 578 for rotation with the odd input shaft 520. Two synchronizers 120 are positioned on the even input shaft 522. One of the synchronizers is employed to selectively engage the reverse gear pinion 582 for rotation with the even input shaft 522 and the other is employed to selectively engage either the second gear pinion 572 or the fourth gear pinion 576 for rotation with the even input shaft 522.

A countershaft 550 is disposed in non-coaxial and spaced relation from the odd input shaft 520 and the even input shaft 522. The countershaft 550 has a plurality of driven gears 552, 554, and 556 mounted thereon for rotation with the countershaft 550. The plurality of driven gears 552, 554, and 556 mounted on the countershaft 550 are each driven for rotation by one or more of the first gear pinion 570, second gear pinion 572, third gear pinion 574, fourth gear pinion 576, and fifth gear pinion 578 when the gear pinions are engaged for rotation by the respective input shafts 520, 522. The reverse gear pinion 582 disposed on the even input shaft drives one of the plurality of driven gears 552, 554, and 556 on the countershaft 550 via an intermediate idler gear 590 mounted for rotation about the idler gear shaft 592. However, there is not necessarily a separate driven gear 552, 554, and 556 on the countershaft 550 for each of the gear pinions 570, 572, 574, 576, 578, and 582. Instead, one or more of the driven gears 552, 554, and 556 on the countershaft 550 is shared by one or more of the gear pinions 570, 572, 574, 576, 578, and 582 on the odd and even input shafts 520, 522, respectively. For example, first gear pinion 578 may drive a corresponding first driven gear 552; second gear pinion 572; or third gear pinion 574; and reverse gear pinion 582 (via the idler gear 590) may drive a corresponding common second/third/reverse driven gear 554; and fourth gear pinion 576 and fifth gear pinion 578 may drive a corresponding common fourth/fifth drive gear 556. An output gear 532 is driven for rotation by the fourth/fifth driven gear 556 of the countershaft 550, and in turn this drives the transaxle 536 having a differential 534.

The dual clutch transmission 500 incorporates a gear ratio both upstream and downstream of the clutches 560 and 562. More specifically, the upstream gear ratio for first, third, and fifth gears is the ratio between the odd clutch drive sprocket 542 and the engine input sprocket 528. Similarly, the upstream gear ratio for the second, fourth, and reverse gears is the ratio between the even clutch drive sprocket 544 and the engine input sprocket 528. The downstream gear ratio for first gear is the ratio between the first gear pinion 570 and the first driven gear 552. The downstream gear ratio for second gear is the ratio between the second gear pinion 572 and the second/third/reverse driven gear 554. The downstream gear ratio for third gear is the ratio between the third gear pinion 574 and the second/third/reverse driven gear 554. The downstream gear ratio for reverse gear is the ratio between the reverse gear pinion 582 and the second/third/reverse driven gear 554. The downstream gear ratio for fourth gear is the ratio between the fourth gear pinion 576 and the fourth/fifth driven gear 556. The downstream gear ratio for fifth gear is the ratio between the fifth gear pinion 578 and the fourth/fifth driven gear 556. The effective gear ratio is the multiple of the upstream gear ratio and the downstream gear ratio for a given gear. By having both the upstream gear ratio and the downstream gear ratio, some or all of the benefits set forth in detail above can be achieved.

It should be further appreciated that the operation of the dual clutch transmission 500 is managed by some type of control device such as an electronic control unit (ECU) that oversees the functioning of the transmission 500, or by an electronic control unit for the vehicle in which the dual clutch transmission 500 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 500 and particularly the clutch engagement functions. Thus, the control method of the present invention as described below is merely a portion, such as a sub-routine, or series of sub-routines, of a larger control scheme within the ECU.

Figure 3:
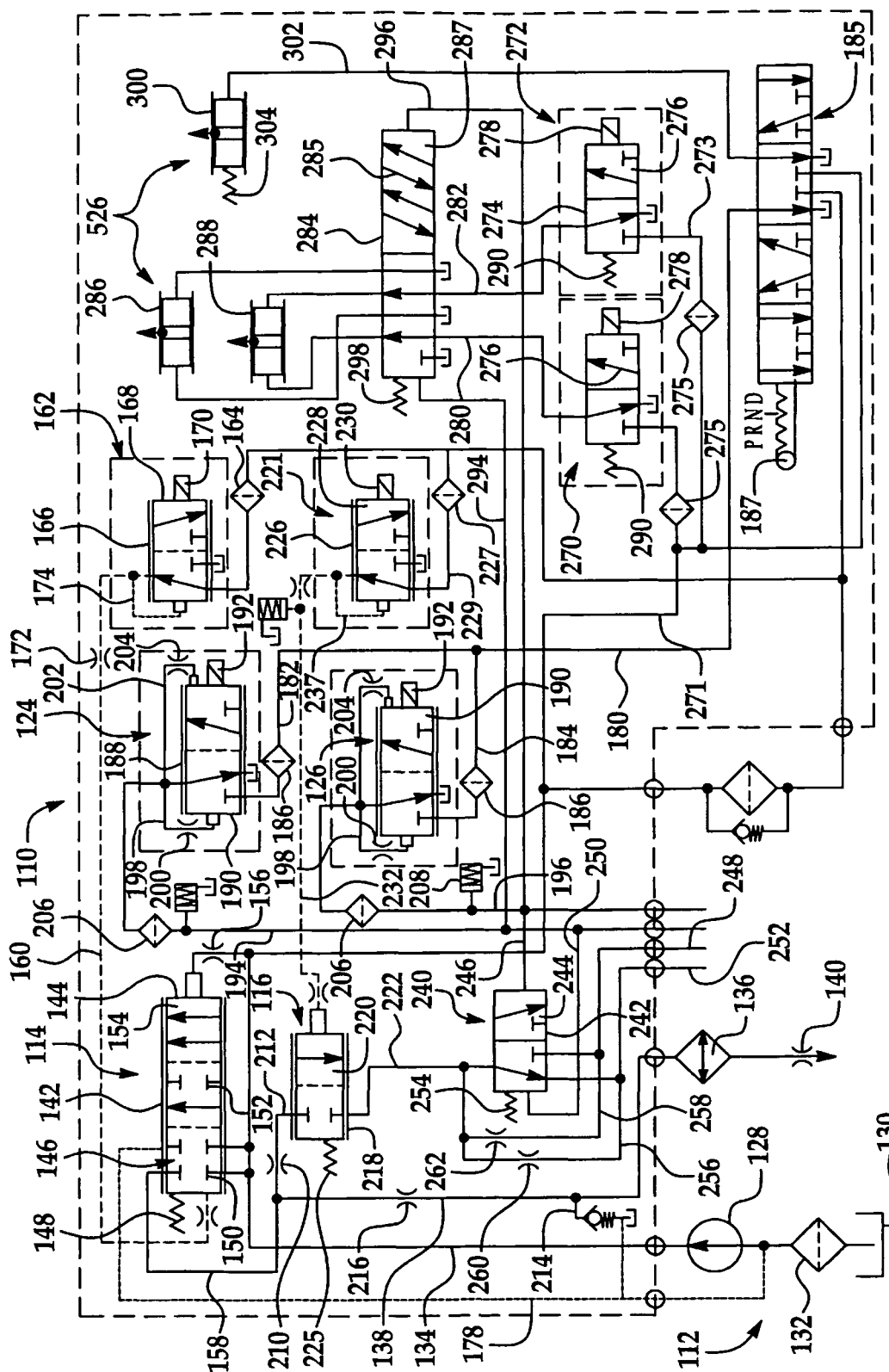
FIG. 3 is a schematic illustration of one embodiment of the hydraulic control circuit of the present invention illustrating the use of a multiplex valve disposed between a pair of actuator valves to control the actuation of gears 2 through 5 as well as a manual valve controlling the actuation of reverse gear.

A hydraulic circuit for controlling and cooling the clutches 560, 562 of the dual clutch transmission is generally indicated at 110 in FIG. 3. Generally speaking, the hydraulic circuit 110 includes a source of pressurized cooling, generally indicated at 112, a main pressure regulator, generally indicated at 114 disposed in fluid communication with the source of pressurized fluid 112 and adapted to provide a predetermined set system pressure for the hydraulic circuit 110. In addition, the hydraulic circuit 110 further includes a lube valve, generally indicated at 116. The lube valve 116 is similarly disposed in fluid communication with the source of pressurized fluid 112. A control actuator, generally indicated at 221 is in fluid communication with the lube valve 116 and is adapted to selectively control the lube valve, as will be described in greater detail below. The hydraulic circuit 110 also includes first and second clutch actuation valves, generally indicated at 124, 126 that are similarly in fluid communication with the source of pressurized cooling fluid 112. Each of the first and second clutch actuation valves 124, 126 correspond to one of the two clutches 560, 562 of the dual clutch transmission and are adapted to provide pressurized fluid to each of the corresponding ones of the clutches 560, 562 of the dual clutch transmission to actuate the clutches. Each of these components of the hydraulic circuit 110 illustrated in FIG. 3 will be described in greater detail below.

The source of pressurized fluid 112 includes a pump 128 that draws the fluid from a sump 130 through a filter 132 and supplies the pressurized control fluid through a main pressure line 134 to the main pressure regulator 114. A cooling unit 136 is in fluid communication with the source of pressurized fluid through line 138 and is adapted to exchange heat from the fluid with other media. The heated fluid passes through the cooling unit, past a restrictor 140, back to the sump 130.

The main pressure regulator 114 maintains the pressure in the regulated line 271 or 134 at a predetermined operating pressure, or set point as will be described in greater detail below. The main pressure regulator 114 is schematically shown in FIG. 3 in its closed position and includes a valve body 142 with a valve member 144 movably supported within the valve body 142. The main pressure regulator 114 also includes internal flow passages, generally indicated at 146 and a biasing member 148 that acts on the valve member 144 to bias it to the right as illustrated in this figure. The flow passages 146 are shown in left 150, middle 152, and right 154 positions of the valve member 144. Pressure in the main pressure line 134 is supplied to the right side of the main regulator valve 114 through a flow restrictor 156 that reduces the flow volume but maintains the applied pressure. With the pump 128 operating, the pressure delivered to the right side of the main pressure regulator 114 overcomes the spring force of the biasing member 148 and moves the valve member 144 of the main pressure regulator 114 to the left from the closed position 150 to the middle operating position 152. Here, the internal flow passages of the middle operating position 152 allow main pressure to flow into the second priority cooling channel. A regulating control line 160, shown as a dotted line in FIG. 3, provides a controllable biasing force to the left side of the main pressure regulator 114. The regulating control line 160 delivers a portion of the system pressure to the left side of the main pressure regulator 114 under the control of the line pressure control valve 162.

The line pressure control valve 162 is electrically operated by an electronic control unit (ECU) to set the regulated pressure set point within the hydraulic circuit 110 and then to maintain the desired pressure by regulating the output pressure to the set point. The line pressure control valve 162 supplies a varying portion of the available main pressure through the regulating line 160 to the main pressure regulator 114 by regulating a portion of the main pressure that is supplied through the filter 164 to the valve 162. More specifically, the line pressure control valve 162 is schematically illustrated in FIG. 3 and includes a valve body 166, a valve member 168 movably supported by the valve body 166, and a solenoid 170. The solenoid 170 is adapted to move the valve member 168 of the line pressure control valve 162 to produce a regulated pressure that is an inverse function of the current delivered to the solenoid 170 and to deliver a predetermined amount of pressurized fluid to the left side of the main pressure regulator 114 through a flow restrictor 172 to assist in moving the valve member 144 of the main pressure regulator 114 to the closed position and against the force generated by the line pressure feedback pressure acting on the right side of the valve member 144 through the flow restrictor 156. In this manner, the line pressure control valve 162 sets the desired output pressure set point for the main pressure regulator 114. The line pressure control valve 162 then varies the pressure in the regulating line to maintain the output pressure delivered from the main pressure regulator 114 about the desired output pressure set point while accounting for fluctuations in the output pressure due to downstream pressure changes. Line 174 provides the feedback pressure from the regulating control line 160 and delivers it to the left side of the line pressure control valve 162 as illustrated in FIG. 3 to assist in returning the valve member 168 to its closed position. Because the solenoid 170 controls the operation of the valve 162, the line pressure control valve 162 can also be called a "line pressure control solenoid" and those having ordinary skill in the art will appreciate that these terms can be used interchangeably.

The main pressure regulator 114 also provides control over rapid increases, or surges, in the main pressure line. The right position 154 of the main regulator valve member 144 opens additional flow passages 146 that not only allow for the continued flow of fluid through the main pressure regulator 114 to the regulated line 271 or 134 and second priority cooling 158, but also allow a portion of the increased flow to pass to the suction line 178. The suction line 178 normally remains closed off by the left and middle positions 150, 152 of the main pressure regulator valve member 144. However, when a sharp or rapid increase of pressure in the main pressure line 134 drives the main pressure regulator valve member 144 all the way to the left, a corrective portion of the flow is fed back to the suction side of the pump 128. As the suction line 178 bleeds off the surge of excessive pressure flow, the main regulator valve member 144 moves back to the middle, operative position 152.

Pressurized fluid is supplied to the first and second clutch actuation valves 124, 126 via actuation line 180 and associated branches 182, 184. Pressurized fluid delivered to the first and second clutch actuation valves 124, 126 is controlled by a manual valve 185 which is operatively connected to the gear shift lever, schematically illustrated at 187. The position of the manual valve is dictated by the gear selection lever 187. More specifically, pressurized fluid is provided to the first and second clutch actuation valves 124, 126 when the gear selection lever 187 is in either reverse or drive position. In addition, those having ordinary skill in the art will appreciate that pressurized fluid may be provided to the first and second clutch actuation valves 124, 126 when the gear selection lever 187 is also in the neutral position. In turn, and as explained in greater detail below, the operation of the clutch actuation valves 124, 126 is controlled by the ECU to engage and disengage the clutches 560, 562 as required by the operational commands given to the transmission.

Before reaching each of the first and second clutch actuation valves, the fluid is filtered at 186. Each of the first and second clutch actuation valves 124, 126 includes a valve body 188, a valve member 190 movably supported within the valve body 188 and a solenoid 192. The solenoid 192 is adapted to deliver a predetermined amount of regulated pressurized fluid to each of the clutches 32, 34 through delivery lines 194, 196, respectively, thereby selectively actuating same. The first and second clutch actuation valves 124, 126 are controlled by the ECU to selectively engage and disengage the respective clutch. A valve return line 198 provides a feedback force through a flow restrictor 200 in a direction opposite to the actuation of the solenoid 192. Similarly, a valve balance line 202 provides a lesser feedback force through a flow restrictor 204 on the solenoid side of the valve member 190. Each of the first and second clutch actuation valves 124, 126 also includes an output filter 206 and a damper 208 downstream of the clutch actuation valves and in advance of the clutches to provide a maximum upper limit for the pressure supplied to actuate the clutches. In their non-operative mode, each of the first and second clutch actuation valves 124, 126 returns any pressurized fluid to the sump 130. As shown in FIG. 3, each of the first and second clutch actuation valves 124, 126 is shown in its non-operative position. Because the solenoid 192 controls the operation of the valves, the first and second clutch actuation valves 124, 126 can also be called "first and second clutch actuation solenoids" and those having ordinary skill in the art will appreciate that these terms can be used interchangeably.

As noted above, the lube valve 116 is in fluid communication with the source of pressurized fluid 112. More specifically, the main pressure regulator 114 is disposed in fluid communication between the pump 128 and the lube control valve 116 through flow restrictors 210 via delivery line 212. A pressure relief valve 214 is operatively connected in fluid communication with the lube control valve 116 to provide a maximum upper limit for the positive pressure provided through the main pressure regulator 114 to the cooler 136 and the lube valve via flow restrictor 216. The lube valve 116 includes a valve body 218 and a valve member 220 movably supported in the valve body 218 to selectively and independently provide a flow of cooling fluid to each of the clutches 560, 562 of the dual clutch transmission to a cooling switch valve 240 through respective cooling line 222, as will be described in greater detail below. To this end, the lube valve includes a biasing member 225 that acts on the valve member to bias it to a normally closed position.

As noted above, the control actuator 221 is in fluid communication with the lube valve 116 and is adapted to selectively control the lube valve. Accordingly, the control actuator 221 is in fluid communication with the source of pressurized cooling fluid via the filter 227 and branch 229. The control actuator 221 includes a valve body 226, a valve member 228 movably supported by the valve body 226 and a solenoid 230. The solenoid 230 is adapted to move the valve member 228 of the control actuator to produce a signal pressure that is an inverse function of the current delivered to the solenoid 230 and to deliver a predetermined amount of pressurized fluid through line 232 (shown as a dotted line) to the right side of the valve member 220 of the lube valve 116 (as illustrated in FIG. 3). Dotted line 237 provides the feedback pressure from the pressurized fluid line 232 and delivers it to the left side of the control actuator 221 as illustrated in FIG. 3 to assist in returning the valve members 228 to their closed positions. In this way, a controlled signal pressure is provided to the right hand side of the lube control valve 116 to move the valve member 220 against the bias of the biasing member 225 to selectively open the lube valve, thereby delivering a controlled, predetermined amount of cooling fluid to the clutches of the dual clutch transmission.

A cooling switch valve 240 receives cooling fluid delivered through the lube valve 116 and selectively directs this cooling fluid to one or other of the dual clutches 560, 562 of the transmission. To this end, the cooling switch valve 240 includes a valve body 242 and a valve member 244 movably supported within the valve body 242. The cooling switch valve 240 is effectively controlled by the actuation of the clutch actuation valves 124, 126. Thus, the majority of pressurized cooling fluid is delivered to the respective clutch upon its actuation of the associated clutch actuation valve 124, 126. To this end, the cooling switch valve 240 receives a pressure bias on the right side of the valve member 244 as illustrated in FIG. 3 via line 246 delivered from the clutch actuation valve 126 through line 196 to direct cooling fluid through the cooling switch valve 240 and line 248 to the clutch 562. Similarly, upon actuation of the clutch actuation valve 124 the cooling switch valve 240 receives a bias on the left side of the valve member 244 via line 250 from pressure line 194 to selectively provide pressurized cooling fluid through the cooling switch valve 240 and line 252 to the clutch 560 of the dual clutch transmission. A biasing member 254 may be employed to bias the valve member 244 to the normally closed position and to the right as illustrated in FIG. 3. A selected amount of cooling fluid may also be supplied from the lube valve 116 to each of the clutches 560, 562 through lines 256, 258 and flow restrictors 260, 262 independent of the clutch actuation valves 124, 126.

To actuate the synchronizers 120, this representative example of a dual clutch transmission 500 utilizes hydraulically driven shift actuators, generally indicated at 526, with attached shift forks to selectively move the synchronizers so that they engage or disengage (neutralize) the desired gears. As shown in FIG. 3, the shift actuators 526 may include essentially two way or dual hydraulic valve assemblies that are driven back and forth linearly, in parallel to one of the input shafts 520, 522, to move a shift fork, and ultimately one of the plurality of synchronizers 120 in and out of engagement. It should be appreciated from the description that follows that other types of actuators that are capable of driving a shift fork back and forth to move a synchronizer may also be employed with the method of the present invention. These include mechanical actuators, hydro-mechanical actuators, electro-mechanical actuators, electrical actuators, and the like.

The application of hydraulic pressure to the shift actuators 526 controls gears 2 and 4 as well as gears 3 and 5 is operatively controlled by a pair of actuator control valves, generally indicated at 270, 272 in FIG. 3. Each of the actuator control valves 270, 272 is in fluid communication with the source of pressurized fluid through lines 271 and 273, respectively. The pressurized fluid is filtered at 275 in both cases. Each of the actuator valves 270 include a valve body 274, a valve member 276 movably supported by the valve body, and a solenoid 278. The solenoid 278 is adapted by application of voltage to the coil to move the valve member 276 of the actuator valve to produce a signal pressure that is an inverse function of the current delivered to the solenoid 278 and to deliver a predetermined amount of pressurized fluid through lines 280, 282, respectively, to a multiplex valve 284. Pressurized fluid flows through the multiplex valve 284 to one of the two shift actuators 286, 288 controlling the odd and even gears, as will be explained in greater detail below. The actuator control valves 270, 272 have biasing members 290 that return the valve member to its normally closed position when de-energized, as shown in FIG. 3. In one preferred embodiment, the pair of actuator valves 270, 272 may consist of on/off solenoids that function in response to the application of voltage to the coil to operatively control the flow of pressurized fluid through these devices. Thus, and while they have been described as "valves," those having ordinary skill in the art will appreciate that the term "on/off solenoids" can be used interchangeably in this regard.

Both of the actuator control valves 270, 272 are illustrated in the de-energized position. It should be appreciated that, as previously mentioned, the shift actuation of the dual clutch transmission 500 may be fully electrical rather than electro-hydraulic, and in that case, the actuator solenoids would be replaced by some type of physical drive devices to move the shift forks and the synchronizers. For clarity, the synchronizers 120 are not illustrated in FIG. 3 and the shift forks are depicted as arrows extending from the shift actuators 526. Each of the shift actuators 526 are dual hydraulic assemblies operatively moving a two sided synchronizer 120 to engage their respective gear sets. As shown in FIG. 3 with respect to this example of a dual clutch transmission 500, there is one actuator control valve 270, 272 for each of the shift actuators 286, 288, respectively. Thus, each actuator control valve 270, 272 must provide pressure to either side of each shift actuator to cause it to engage the synchronizers 120 in both directions. To this end, the actuator control valves 270, 272 are multiplexed (i.e., used for more than one operation) through the use of a multiplex valve 284. The multiplex valve includes a valve body 285 and a valve member 287 movably supported therein. In the simplified scheme of the present invention, the multiplex valve 284 is controlled by clutch actuator valves 124, 126 which apply hydraulic pressure through lines 294 and 296 to either side of the multiplex valve member 287. A biasing member 298 is employed to bias the valve member 287 of the multiplex valve 284 to the right as shown in this figure. Through the multiplex valve 284, each actuator control valve 270, 272 provides the hydraulic pressure for two shift movements. The actuator control valves 270, 272 are electrically controlled by the ECU through the application and interruption of a voltage to the coil assemblies of the individual solenoids 278. The biasing member 290 that returns the valve member to its normally closed position when de-energized, as shown in FIG. 3.

It should be further appreciated that the disengagement of the synchronizers 120 and thus the neutralization of an engaged gear set is accomplished by actuating the opposing side of the respective shift actuator 286, 288. This opposing, neutralizing actuation of the shift actuator 286 or 288 is only to the point of moving the shift fork and respective synchronizer to the neutral and disengaged position without continuing the actuation to a full engagement of the opposing gear set.

As noted above in connection with the description of the dual clutch transmission 500 illustrated in FIGS. 1 and 2, the actuation of the first gear 570 is facilitated by use of a one-way clutch 594. Thus, a synchronizer for the first gear has been eliminated. Similarly, but unlike the case of gears 2-5 described above, the actuation of the reverse gear 582 is not controlled by the actuator control valves 270 or 272. Rather, the actuator 300 associated with reverse gear 582 is controlled by the manual valve 185 via the pressure line 302. Thus, the actuator 300 associated with the reverse gear 582 is actuated when the gear shift lever is moved to the reverse position. The actuator 300 associated with the reverse gear 582 is disengaged or moved to its neutral position when the gear shift actuator 187 is disposed in any of its other positions (park, neutral, or drive). A return spring 304 biases the actuator 300 to the neutral position.

In operation, pressurized control fluid is supplied by the pump 128 into the main pressure line 134. This pressurized fluid is regulated by the main pressure regulator 114 which supplies line pressure through the regulated line 271 or 134 to the rest of the hydraulic circuit 110. The main pressure regulator is controlled by the pressure control valve 162, which in turn is controlled by the ECU to establish a system pressure. Similarly, first and second clutch actuation valves 124, 126 are controlled by the ECU to selectively provide pressurized fluid to the clutches 32, 34 through delivery lines 194, 196, thereby actuating same. Control actuator 221 is similarly controlled by the ECU to provide a predetermined amount of pressurized fluid which acts on the right hand side of the lube valve 116. The cooling switch valve 240 controls the flow of cooling fluid to both clutches 560, 562 as dictated by the clutch control valve 124, 126. Actuator control valves 270, 272 control the flow of pressurized fluid through the multiplex valve 284 which, in turn, is also controlled by the clutch control valves 124, 126 which, in turn, controls the movement of actuators 286 and 288. Actuators 286 and 288 control the synchronization of gears 2 through 5. The transmission 500 uses a one-way clutch 594 in place of a synchronizer for first gear 570. On the other hand, the movement of actuator 300 associated with reverse gear 582 is controlled by the manual valve 185. Pressurized fluid is supplied to the actuator 300 when the gear shift lever 187 selects the reverse gear. Thus, the transmission 500 of the present invention employs a one-way clutch 594 in connection with first gear 570, an actuator 300 that is operatively controlled by a manual valve 185, and a pair of solenoid actuated actuator valves 270, 272 to control the operation of two other actuators 286, 288 to control shifts between gears 2 through 5. In this way, the present invention employs a much simplified hydraulic circuit resulting in lower costs while still maintaining efficient operation of the transmission.

It should also be appreciated that other routing arrangements may also be employed without departing from the scope of the present invention. Furthermore, the cooling unit 136 may be a heat exchanger physically disposed outside of the transmission and exposed to an air stream to allow heat to transfer from the cooling fluid to the air stream. The cooling unit may also be outside of the transmission and physically disposed within another heat exchanger within the vehicle, such as the vehicle's main radiator so that the cooling unit is exposed to the liquid media of the radiator to allow heat to transfer from said cooling fluid to the liquid media.

The invention has been described in an illustrative manner. It is to be understood that the terminology that has been used is intended to be in the nature of words of description rather than of limitation. Many modifications and variations of the invention are possible in light of the above teachings. Therefore, within the scope of the claims, the invention may be practiced other than as specifically described.

We claim:

1. A dual clutch transmission (500) having a plurality of forward gears and at least one reverse gear (582) for providing rotational output in two directions and at different gear ratios through a countershaft, said dual clutch transmission (500) comprising:
   a first gear set (570) operatively engaged with a first input shaft (520) by a one-way clutch (594) to provide a first gear;
   a plurality of other gear sets (572, 574, 576, 578);
   first and second actuators (526) adapted to selectively engage the plurality of other gear sets with either the first input shaft (520) or a second input shaft (522) to selectively provide torque translation through the plurality of forward gears providing second, third, fourth and fifth gears;
   the gear sets selectively engaged with the first input shaft by the first actuator providing third and fifth gears, the gear sets selectively engaged with the second input shaft by the second actuator providing second and fourth gears;
   a hydraulic circuit (110) having a source of pressurized fluid (112);
   a pair of actuator control valves (270, 272) in fluid communication with the source of pressurized fluid (112), said pair of actuator control valves (270, 272) adapted to move said actuators to engage selective ones of the forward gear sets;
   a multiplex valve (284) disposed in fluid communication between said pair of actuator control valves (270, 272) and the actuators associated with the forward gears of said transmission and adapted to selectively provide fluid communication to said actuators to thereby select the forward gear ratios; and
   a manual valve (185) operatively connected to a gear shift selector (187) and in fluid communication with said source of pressurized fluid (112), said manual valve operable to control a reverse actuator associated with the reverse gear (582) in response to selection of the reverse gear (582) by said gear shift selector (187) to move said actuator into and out of engagement with the reverse gear set to selectively engage the reverse gear with the second input shaft;
   wherein only the first and second actuators selectively engage second through fifth gears, only the reverse actuator selectively engages reverse gear; and only the one-way clutch engages first gear.

2. The dual clutch transmission (500) as set forth in claim 1 wherein said multiplex valve (284) includes a valve body (285) and a valve member (287) moveably supported within said valve body (285), said hydraulic circuit (110) further including first and second clutch actuation valves (124, 126) in fluid communication with said source of pressurized fluid (112) with each of said first and second clutch actuation valves (124, 126) corresponding to one of the clutches (560, 562) of the dual clutch transmission (500) so as to provide pressurized fluid to each of the corresponding ones of the clutches of the dual clutch transmission to actuate same and also adapted to provide pressurized fluid to either side of the valve member (287) of the multiplex valve (284) thereby controlling the actuation of said multiplex valve (284) and the selection of the forward gear ratios of the transmission.

3. The dual clutch transmission (500) as set forth in claim 1 wherein said first gear set (570) comprises a first gear pinion rotatably mounted on an input shaft (520) as a driving gear having a diameter sufficient to place the one-way clutch (594) between the input shaft (520) and the first gear pinion, the first gear pinion engaging a driven gear on the countershaft.

4. A dual clutch transmission comprising:
   a first input shaft (520) with a first gear pinion (570), a third gear pinion (574), and a fifth gear pinion (578) rotatably mounted on the first input shaft;
   a first input clutch (560) selectively engaging the first input shaft with an engine input shaft (524) to selectively drive the first input shaft;
   a second input shaft (522) with a reverse gear pinion (582), a second gear pinion (572), and a fourth gear pinion (576) rotatably mounted on the second input shaft;
   a second input clutch (562) selectively engaging the second input shaft with an engine input shaft (524) to selectively drive the first input shaft;
   a countershaft (550) selectively driven by the first input shaft and the second input shaft to provide output from the dual clutch transmission;
   a first actuator (286) selectively engaging the third and fifth gear pinions with the first input shaft;
   a second actuator (288) selectively engaging the second and fourth gear pinions with the second input shaft;
   a reverse actuator (300) selectively engaging the reverse gear pinion with the second input shaft;
   a multiplex valve (284) controlling the first and second actuators, the multiplexing valve shifted between positions to control the first and second actuators by a first clutch actuation valve (124) that supplies pressure to shift the multiplex valve to one position and a second clutch actuation valve (126) that supplies pressure to shift the multiplex valve to another position;
   wherein the first and second clutch actuation valves also selectively provide pressurized fluid to actuate the first and second input clutches.

5. The dual clutch transmission as set forth in claim 4 further comprising a one-way clutch (594) positioned between the first input shaft and the first gear pinion, wherein to provide first gear the countershaft is driven by the first input shaft which rotates the first gear pinion through the one-way clutch, and the first gear pinion engages a first driven gear (552) on the countershaft to rotate the countershaft.

6. The dual clutch transmission as set forth in claim 5 wherein the first and second input clutches are driven by an engine input sprocket (528) that is driven by the engine input shaft.

7. The dual clutch transmission as set forth in claim 6 further comprising a damper (530) disposed between the engine input shaft and the engine input sprocket, configured to absorb vibrations.

8. The dual clutch transmission as set forth in claim 4 further comprising a manual valve (185) operatively connected to a gear shift selector (187) and in fluid communication with a source of pressurized fluid (112), the manual valve operable to control the reverse actuator in response to selection of the reverse gear pinion (582) by the gear shift selector (187) to move the reverse actuator into and out of engagement with the reverse gear pinion to selectively engage the reverse gear pinion with the second input shaft; wherein the manual valve also selectively supplies pressurized fluid to the first and second clutch actuation valves.

9. The dual clutch transmission as set forth in claim 8 wherein pressurized fluid is supplied to the first and second clutch actuation valves when the gear shift selector is in either a park, neutral or reverse position only.

* * * * *